Dec. 23, 1958   E. E. JUDGE, SR   2,865,338
HYDRAULIC POWER FEED MECHANISM FOR MACHINE TOOLS
Filed Dec. 13, 1956   3 Sheets-Sheet 1

INVENTOR.
EDWARD E. JUDGE SR.
BY
Farley, Forster and Farley
ATTORNEYS

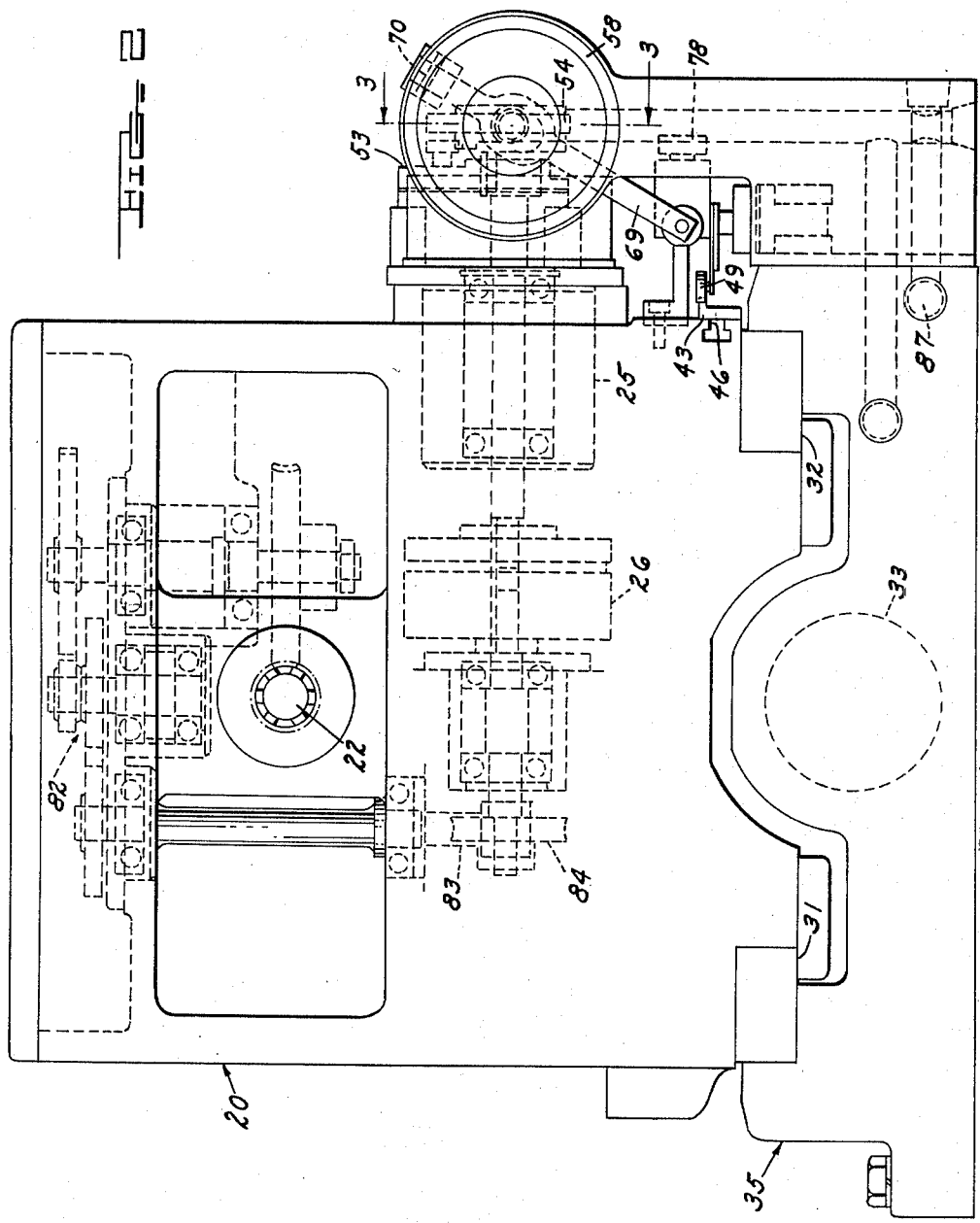

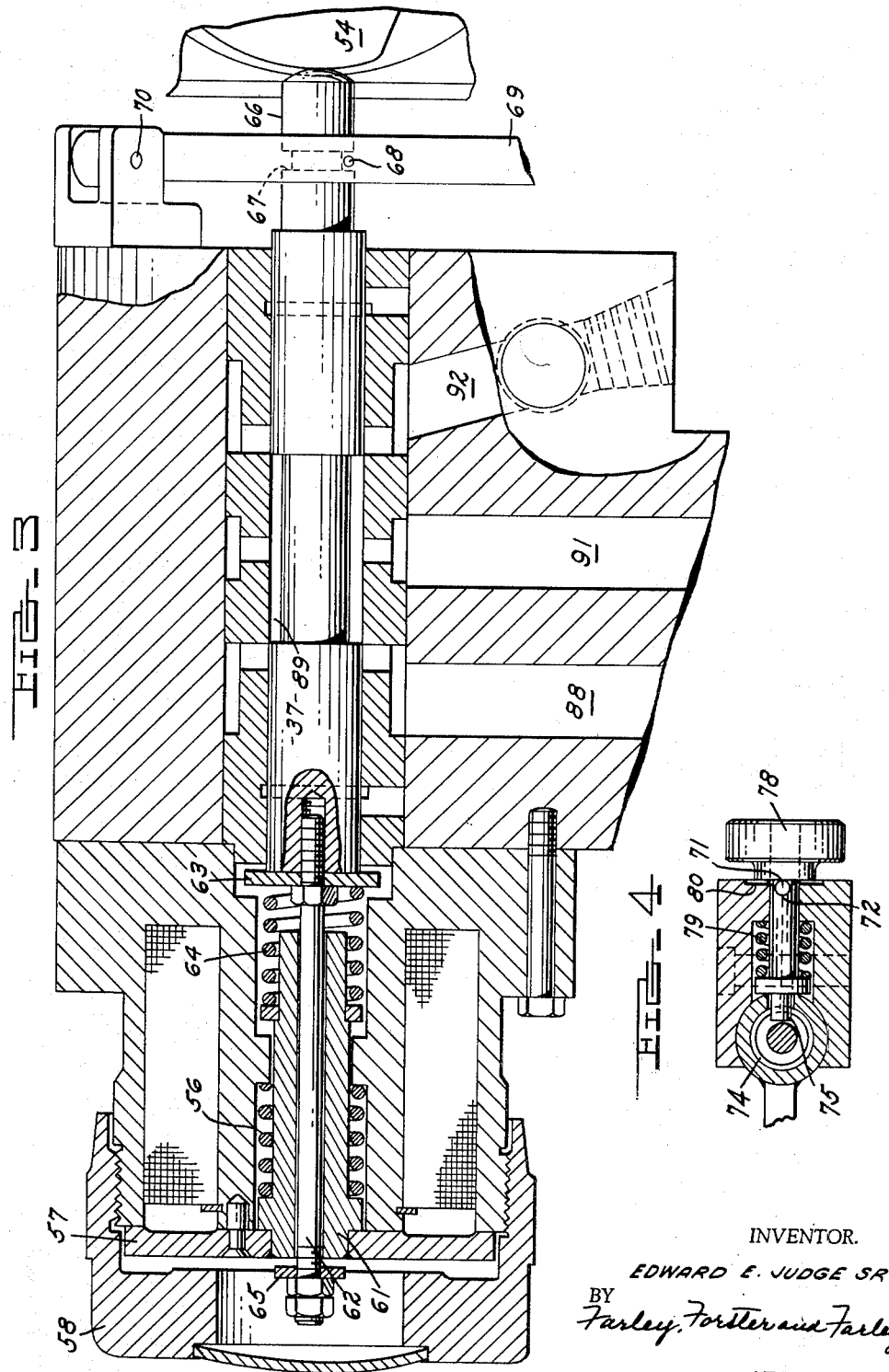

United States Patent Office 2,865,338
Patented Dec. 23, 1958

2,865,338

HYDRAULIC POWER FEED MECHANISM FOR MACHINE TOOLS

Edward E. Judge, Sr., Lansing, Mich., assignor to Industrial Metal Products Corp., Lansing, Mich., a corporation of Michigan Application December 13, 1956, Serial No. 628,056

9 Claims. (Cl. 121—45)

This invention relates to a power feed mechanism for a machine tool and more particularly to an assembly that is capable of applying to a movable tool carriage or workpiece any desired predetermined constant or variable feed rate, unaffected by changes in load, through means for increasing the feed power, as needed, to overcome any resistances encountered in establishing and maintaining the required feed rate.

With the means of this invention, a movable machining unit may be guided into a workpiece at a particular predetermined feed rate by establishing a control rate which may be either constant or variable, by sensing any difference between the actual feed rate and the desired control rate and then diminishing or increasing the feed power to equalize the two rates. This is accomplished in the preferred embodiment by a rotating feed rate cam moving with the machining head and acting against a valve in a stationary mounting which applies or relieves hydraulic pressure to or from a feed actuating piston adapted to move the machining head. The cam and valve positions may, of course, be reversed. By means of this invention a constant pressure is applied to the rod side of the piston while a variable pressure regulated by the aforementioned cam-valve combination is directed to the relatively larger piston face area whereby a single regulated pressure may be employed in combination with the differential piston area to control both the rate and direction of feed.

A starting signal energizes a solenoid initiating the feed stroke which is rapid up to the actual machining position and thereafter gradually carried through at a predetermined constant or varying feed rate until the stroke is completed and, if desired, a dwell period is possible at the end of the feed stroke for machining finish. A rapid return stroke completes the cycle which is entirely automatic.

From the above brief description it will be understood that one of the main objects of my invention is the provision of a feed control which may be precisely adapted to the particular individual requirements of any machining operation, including rapid traverse to the intial cutting position, constant or varying feed rate throughout the machining operation, a dwell at the end if desired for finish, and rapid retraction to complete the operating cycle in a minimum period of time.

Another object is to provide a feed control which automatically compensates for varying resistance to feed as through dulling of the cutting tool, frictional variations, hard spots in the workpiece, etc. by establishing instantaneous variations in feed pressure as required to exactly maintain the predetermined rate of feed.

Another object is to provide a feed control which may be readily adjusted to meet the different requirements of different machining operations.

Another object is to employ a hydraulic feed control wherein a single regulated pressure is effective to establish and maintain feed rate and direction.

Another object is to employ a simple spool valve construction having a central metering position for accurately controlled feed rate, as well as end positions for rapid traverse advance and retraction movement.

Another object is to adapt electrical solenoid controls, responsive to adjustable limit switches to control the end positions of such valve and thereby the stroke and direction of movement as required for automatic cycling.

Another object is to adapt control cam means to regulate the central metering position for the control valve whereby the rate of cam actuation together with the curve designed into the cam face may be combined to produce any desired constant or varying feed rate curve.

These and other objects and advantages will become more apparent when an embodiment is described in connection with drawings in which:

Figure 2 is an end view showing the movable unit slidable on ways in the base as well as the drive for the feed cam and the automatic slide reversal unit;

Figure 3 is a section taken at 3—3 of Figure 2 showing an enlarged view of the valve assembly; and Figure 4 is a section taken at 4—4 of Figure 1 showing the spring loaded stop for return stroke.

Figure 1:
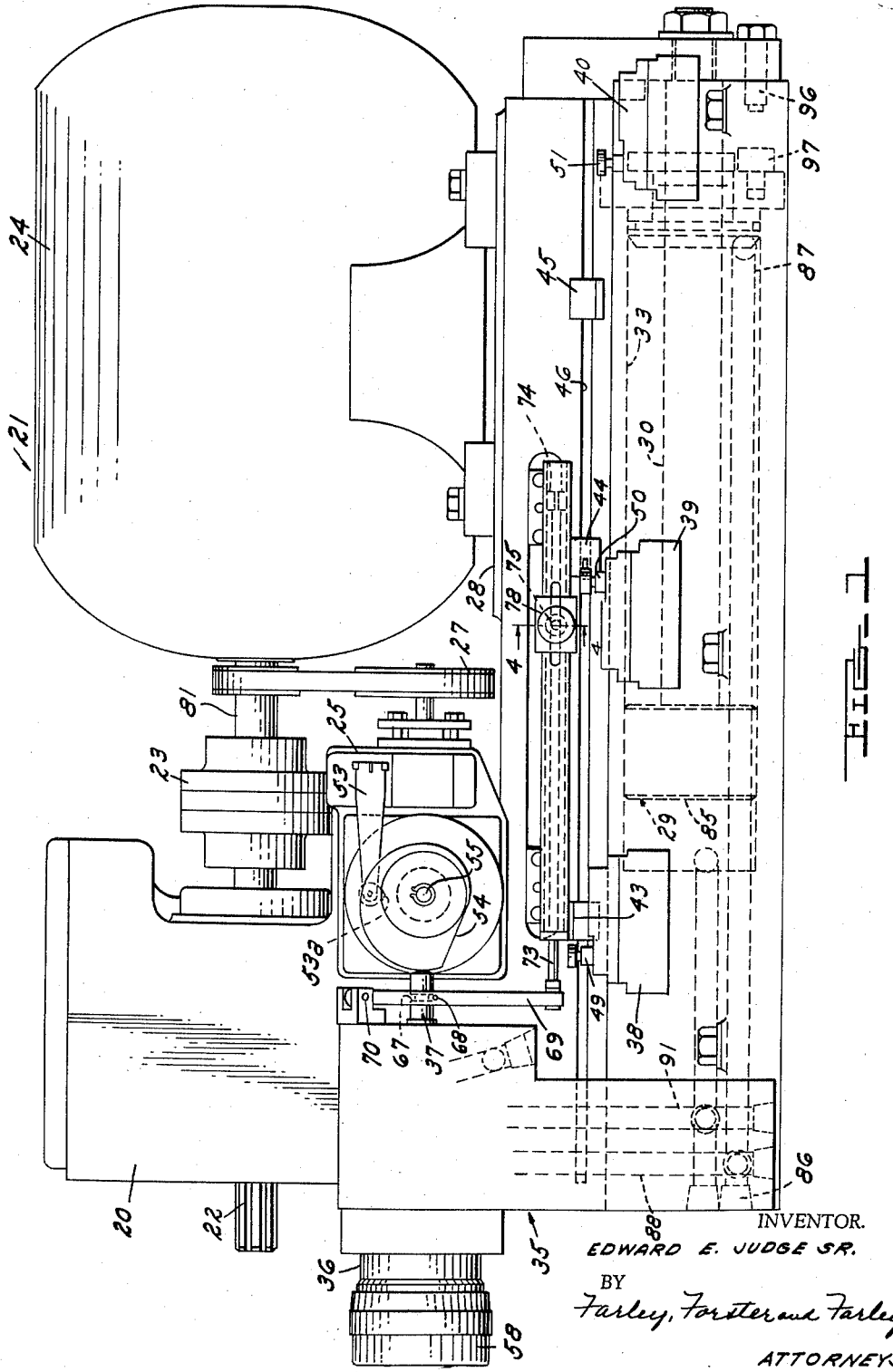
Figure 1 is an elevational view of a preferred embodiment with the valve, feed cam, and slide shown at the beginning of the cam controlled feed portion of the cycle.

In Figure 1 is seen the movable unit 21 which includes tool spindle 22, reduction gearing 20, coupling 23, motor 24, cam and brake assembly 25, oil pump drive 27, slide 28, piston 29 and rod 30. Stationary base 35 incorporates cylinder 33, solenoid assembly 36, spool valve 37, and switch assemblies 38, 39 and 40. Predominant differential pressure against the rod or face side of piston 29 moves the entire unit 21 forward (to the left), or back (to the right) on ways 31, 32 shown in Figure 2 relative to the base 35.

Unit 21 is shown in Figure 1 after initial forward movement prior to machining engagement and just before cam 54, driven about pivot 55, is unlocked to continue the forward movement at the rate determined by the shape and rotational speed of cam 54 as it acts against spool 37.

Dogs 43, 44, and 45 are adjustably secured in slot 46 of slide 28, and register respectively with limit switches 49, 50, and 51. When switch 50 is tripped or made, brake 25 is released and clutch 26 is engaged starting the rotation of cam 54. When switch 49 is tripped by dog 43 (and optionally when a time delay in switch assembly 38 times out), solenoid 36 is de-energized allowing spring 56, seen in Figure 3, to push armature 57 leftwardly against cap 58.

Fixed to armature 57 is slider 61 through which bolt 62 is movable. Bolt 62 is attached to spool 37 and supports washer 63 against which spring 64 acts. Washer 65 at the other end of bolt 62 is engaged by slider 61 at the end of the forward stroke when solenoid 36 is de-energized. Nose 66 of spool 37 rides against the surface of cam 54 and has slot or annulus 67 adapted to receive pin 68 of link 69 which is pivoted at 70.

The lower end of link 69 is attached to stop rod 73, seen in Figure 1, which has collar 74 at its other end which registers with and is moved axially by finger 75 which is fixed to and adjustable in slide 28. Knob 78 moves finger 75 outwardly from collar 74 against the pressure of spring 79, seen more clearly in Figure 4, where finger 75 may be locked by turning knob 78 a quarter turn in either direction. This locking occurs by moving pin 71, which is attached to knob 78, out of slot 72 and placing it in groove 80.

Cam 54 is driven from shaft 81 at one of many possible speeds through change gears 82, worm 83, worm wheel 84 and an electrically operated clutch 26. This drive train may be best seen in Figure 2. Cam 54 can be driven only when the clutch of assembly 26 is engaged and brake 25 is released which is accomplished by tripping switch 50.

The entire unit 21 is moved by applying pressure to or relieving pressure from the left face 85 of piston 29, the rod side of piston 29 having a constant supply pressure applied from inlet 86 and through tube 87. The supply pressure also is applied to passage 88 which is registrable with annulus 89 in spool 37. Conduit 91 communicates with piston face 85 and is registrable with annulus 89 as is return 92 which leads to a reservoir or other low pressure. When spool 37 is shifted rightwardly, conduit 91 is connected to exhaust passage 92 and piston 29 moves unit 21 leftwardly, and when spool 37 is shifted leftwardly, conduit 91 is connected to supply pressure through passage 88 and piston 29 moves unit 21 rightwardly. In the latter instance the pressures on both sides of piston 29 are the same but face 85 has more area subject to pressure and hence has a greater force exerted against it. The forward travel of unit 21 is limited by adjustable stop 96 as it abuts block 97 and rearward travel is normally controlled by the engagement of finger 75 with collar 74 accompanied by dog 45 tripping rear limit switch 51 signalling that the unit 21 is back.

Operation

Unit 21, as mentioned, is shown in a position corresponding to the beginning of the controlled feed cycle. To return slide unit 21 to its normal rearward rest position solenoid 36 is de-energized so that spring 56 will force armature 57 and spool 37 leftwardly connecting pressure passage 88 with conduit 91 moving piston 29, and hence unit 21, to a rearward position controlled by the engagement of stop finger 75 with collar 74 at the end of stop bar 73 which through link 69 moves valve 37 to a central hydraulic balance position. Limit switch 51 is actuated by dog 45 at the end of such return stroke completing the electrical control cycle. A starting signal from a source not shown but which may be from a manual or automatic movement, energizes solenoid 36 which creates a magnetic field attracting armature 57 to the position shown in Figure 3 moving spool 37 rightwardly connecting piston face 85 to exhaust as previously explained. Since pressure is constantly applied to the rod side of piston 29, the piston moves rapidly forwardly until dog 44 trips switch 50 starting cam 54 and cam 54 contacts nose 66 of spool 37 moving it forward to a rate control position whereafter the rate at which unit 21 moves forwardly is dependent upon the rotational rate, as determined by the position of change gears 82, and shape of cam 54. When cam 54 initially contacts nose 66, spool 37 is moved an increment leftwardly against spring 64 slowing the forward movement of unit 21 by decreasing the opening between conduit 91 and return 92 to an orifice position which maintains a balancing pressure on the face 85 of piston 29 corresponding to the rate of discharge required by cam 54. If the forward movement is slowed too much, or if the resistance to movement increases, then cam 54 causes spool 37 to move rightwardly under pressure of spring 64 increasing the discharge orifice connecting conduit 91 to exhaust passage 92 moving unit 21 under the resulting greater differential pressure across the piston.

It is seen then that by minute movements and reciprocations of spool 37, the correct pressure differential is maintained across piston 29 to provide the selected feed rate regardless of load. Cam 54 may assume an infinite number of shapes and rotational speeds offering a control means for every possible feed rate, and any deviation by unit 21 from the control rate is instantly sensed for automatic correction. Spool 37 constantly strives to center itself at a correct metering position since its movement away from such position in either direction will cause a corrective change in the differential pressure for moving unit 21 whereby spool 37 will be returned to correct position.

As the forward stroke is completed, dog 43 trips switch 49 de-energizing solenoid 36 moving armature 57 and slider 61 against cap 58 under the pressure of spring 56. This causes slider 61 to abut washer 65 moving spool 37 leftwardly moving piston 29 rightly until finger 75 registers with collar 74 moving rod 73, link 69 and spool 37 rightwardly to a hydraulically balanced piston position stopping the return stroke. If desired, a time delay may be incorporated in switch assembly 38 so that solenoid 36 will not be immediately de-energized allowing for a dwell period, the engagement of adjustable positive stop 96 with block 97 preventing further forward travel.

By pulling knob 78 outwardly against the pressure of spring 79 and locking it with a quarter turn, unit 21 will move rearwardly to a maximum back position as for tool change.

Since pressure is constantly applied to the rod side of piston 29, no valving for this side is necessary and therefore by applying or relieving pressure to face 85, the piston can be made to reciprocate since face 85 has a larger area than the rod side. Also when pressure is applied to face 85 from passage 88, a portion of the flow comes from the rod side through tube 87 minimizing the necessary volume capacity of the pump for a rapid return stroke.

The rotating cam 54 completes one revolution during the feed and rapid return stroke of the slide unit 21 and is stopped when a limit switch is actuated by arm 53 as the roller at its end drops into a notch 53a rotatively associated with cam 54 thereby de-energizing clutch 26 and energizing brake 25.

While a particular preferred embodiment has been disclosed and described above in detail it will be understood that numerous modifications may be resorted to without departing from the scope of my invention as defined in the following claims.

I claim:

1. A feed mechanism comprising a driven unit and a frame, said driven unit comprising a piston and rod hydraulically actuated in a conforming chamber of said frame so that said driven unit is movable in forward and retract directions relative said frame, a hydraulic pressure source connected to the rod side of said piston, reciprocable valve means in said frame for connecting said hydraulic pressure or exhaust to the face side of said piston depending on the longitudinal position of said valve means, said driven unit carrying rotatable cam means engageable with said valve means for imparting longitudinal movement thereto, so that the rotation rate and shape of said cam means can be chosen to cause said valve means to control hydraulic power operating on said piston to move said driven unit at a desired drive rate.

2. The feed mechanism of claim 1 with first valve actuating means for urging said valve means towards said cam means so that when the drive rate of said cam means carrying drive unit is slower than the engaging surface of said cam means said valve means will increase the drive rate, and where the drive rate is faster than the engaging surface of said cam means said valve means will decrease the drive rate.

3. The feed mechanism of claim 2 with an overriding second valve actuating means for selectively moving said valve means away from said cam means to connect said piston face with retract pressure.

4. The feed mechanism of claim 1 including solenoid operated resilient means for selectively biasing said valve means to an advance or a retract position.

5. The feed mechanism of claim 4 including means actuated by the final movement of said unit in a retract direction to urge said valve means toward a neutral position.

6. The mechanism of claim 5 wherein said last means comprises a frame pivoted lever connected to said valve means with said lever being engageable with an actuator on said driven unit to move said valve means towards said cam means.

7. The mechanism of claim 4 with means for actuating said solenoid to a retract position when said unit has travelled to a maximum forward position relative said frame.

8. The mechanism of claim 1 including cam lock and clutchable cam driving means, means for unlocking said cam lock means and engaging said clutchable cam driving means responsive to the advance of said driven unit to a predetermined position on said frame whereby said driven unit will move for a predetermined forward distance with said cam locked providing a quick advance take up of said driven unit before said desired drive rate becomes effective.

9. The mechanism of claim 1 with means to terminate said forward drive rate after said unit has reached a certain point relative said frame thereby preventing a carry-over travel.

References Cited in the file of this patent

UNITED STATES PATENTS

| Number | Name | Date |
|---|---|---|
| 1,883,166 | Vickers | Oct. 18, 1932 |
| 2,055,530 | Hallenbeck | Sept. 29, 1936 |
| 2,491,551 | Cross | Dec. 20, 1949 |
| 2,569,526 | Johnson | Oct. 2, 1951 |
| 2,601,157 | Lan | June 17, 1952 |